June 5, 1945. W. P. KESSLER 2,377,427
SASH CONSTRUCTION
Filed Dec. 31, 1942 3 Sheets-Sheet 2
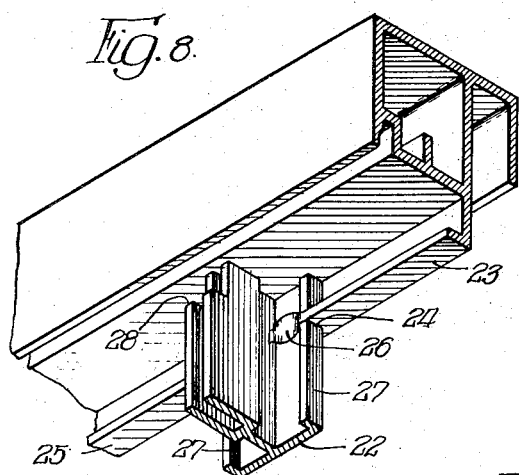
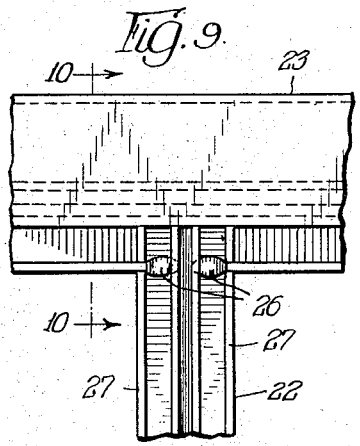
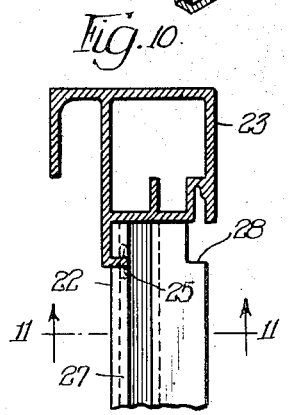
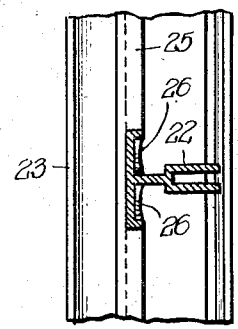
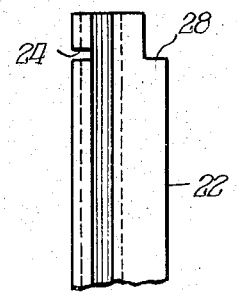
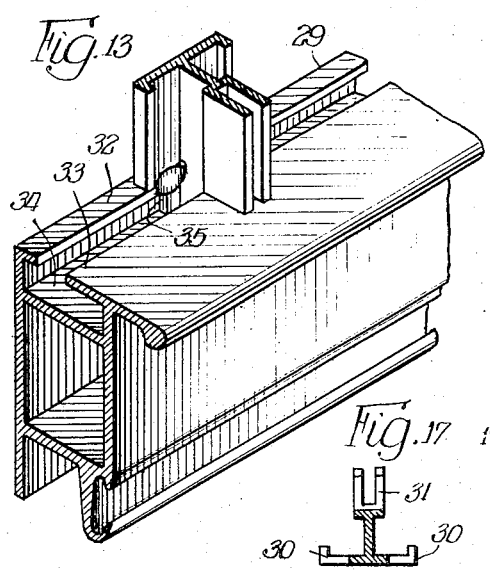
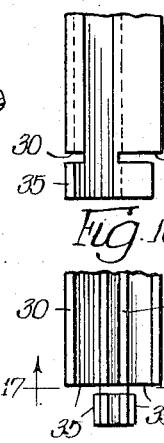
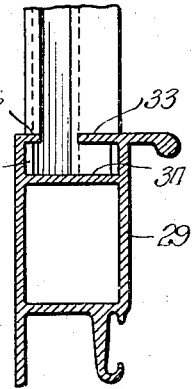
INVENTOR.
Ward P. Kessler,
BY Cromwell, Greist + Warden
attys

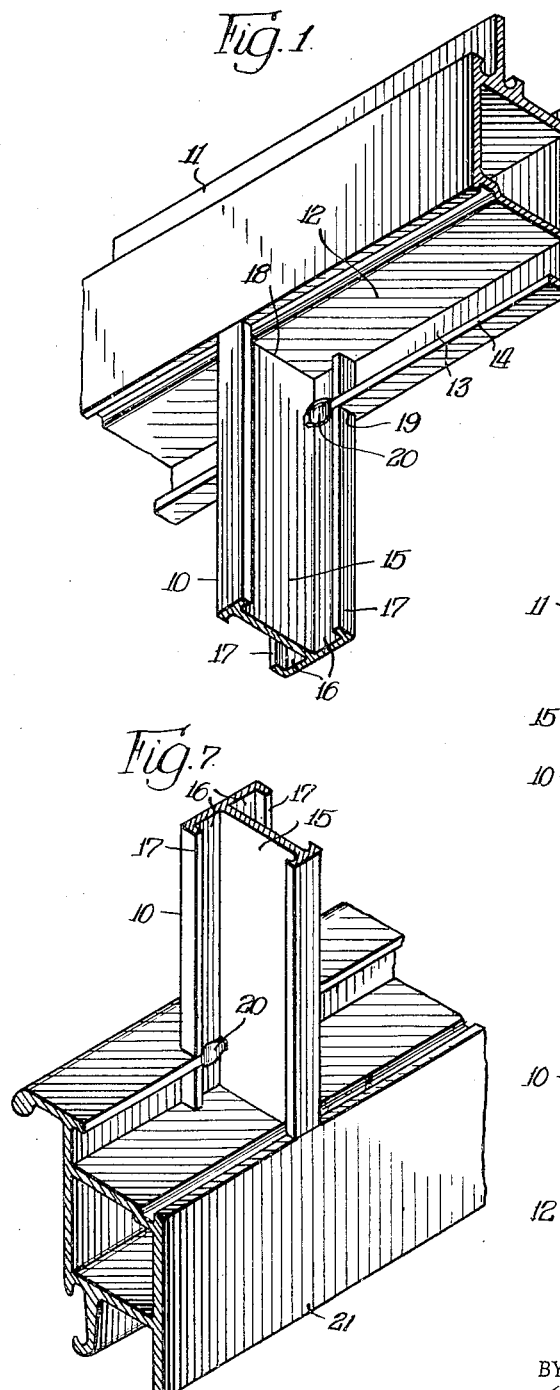
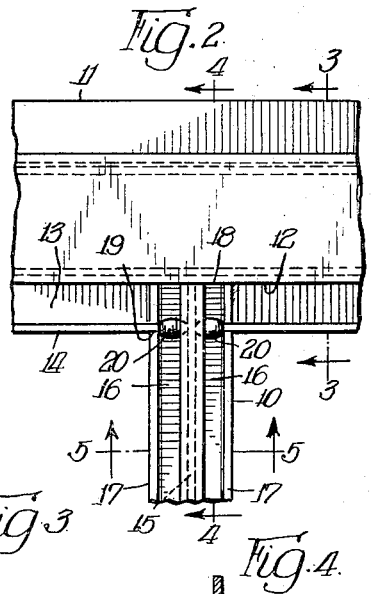
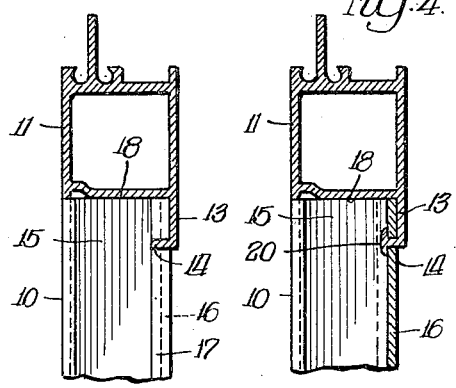
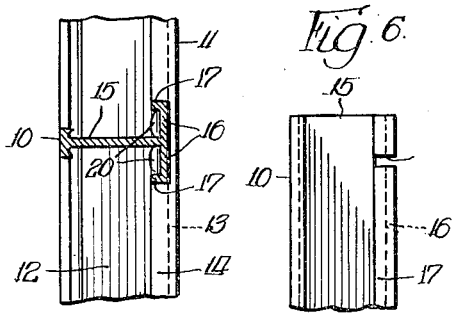

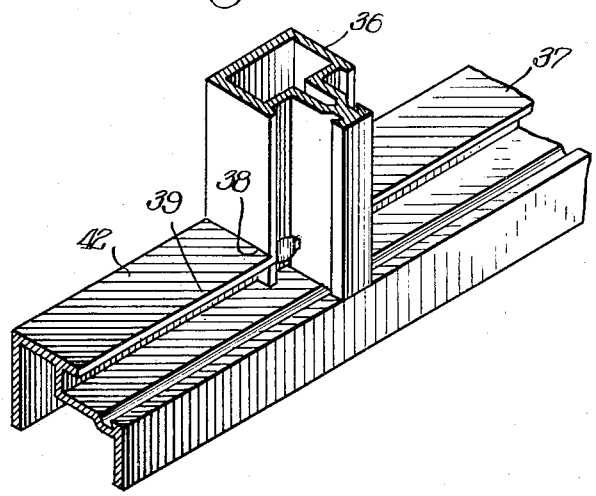
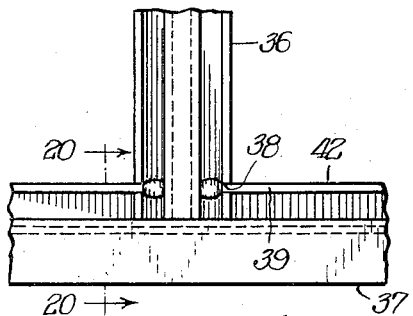
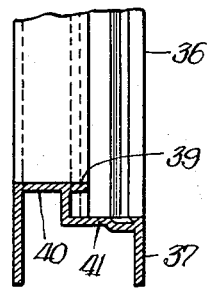
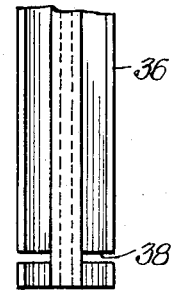
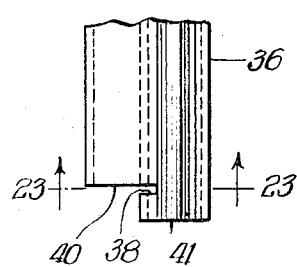
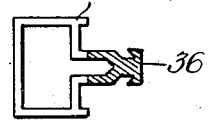

Patented June 5, 1945

2,377,427

UNITED STATES PATENT OFFICE 2,377,427

SASH CONSTRUCTION

Ward P. Kessler, Elkhart, Ind., assignor to The Adlake Company, Chicago, Ill., a corporation of Illinois Application December 31, 1942, Serial No. 470,805

3 Claims. (Cl. 189—76)

In the fabrication of aluminum sash the anchorage of the muntins to the rails frequently presents a troublesome problem. For some sash in a particular job no muntins at all may be specified while in other sash of the same or different sizes for the same job a variety of different muntin arrangements may be specified. Because of this the sash must ordinarily be separately fabricated to individual specifications, with the ends of the muntins set into the rails of the sash in the required arrangement at the time of assembly of the sash. Not only is this practice costly and time consuming, but the cutting away of portions of the rails to receive the ends of the muntins tends to seriously weaken the sash.

The purpose of the present invention is to provide an improved form of muntin anchorage which eliminates the necessity of cutting out portions of the rails, permits the muntins to be installed quickly and easily in any desired arrangement after the rails of the sash have been permanently connected together, and affords a finished connection between the muntins and the rails which is strong, tight and rigid.

While the foregoing statements are indicative in a general way of the nature of the invention, other more specific objects and advantages will be apparent to those skilled in the art upon a full understanding of the nature of the novel muntin anchorage.

Several different embodiments of the invention are presented herein by way of illustration but it will of course be appreciated that the invention is susceptible of incorporation in various other structurally modified forms coming equally within the spirit of the invention and the scope of the appended claims.

In the accompanying drawings:

Fig. 1 is a fragmentary perspective view of a muntin anchored in accordance with the invention to the top rail of a sash;

Fig. 2 is a face view of the rail at the location of the muntin;

Fig. 3 is a vertical section through the rail, at one side of the muntin, taken on the line 3—3 of Fig. 2;

Fig. 4 is a vertical section through both the rail and the muntin, taken on the line 4—4 of Fig. 2;

Fig. 5 is a horizontal section through the muntin, at a point near the rail, taken on the line 5—5 of Fig. 2;

Fig. 6 is a side view of the upper end of the muntin, after being cut off and slotted to fit with the rail and before being applied to the latter;

Fig. 7 is a fragmentary perspective view of a muntin of the same configuration anchored in accordance with the invention to the bottom rail of a sash;

Fig. 8 is a fragmentary perspective view of a muntin anchored in accordance with the invention to the upper rail of a lower sash, showing a muntin and rail of modified cross sectional configuration;

Fig. 9 is a face view of the muntin anchorage shown in Fig. 8;

Fig. 10 is a vertical section, taken on the line 10—10 of Fig. 9;

Fig. 11 is a horizontal section, taken on the line 11—11 of Fig. 10;

Fig. 12 is a side view of the lower end of the muntin shown in Figs. 8 to 11, inclusive, after being cut off and slotted to fit with the rail and before being applied to the latter;

Fig. 13 is a fragmentary perspective view of a muntin of the same cross sectional configuration anchored in accordance with the invention to the bottom rail of a lower sash;

Fig. 14 is a horizontal section through the bottom rail, at one side of the muntin;

Fig. 15 is a side view of the lower end of the muntin, after being cut off and slotted and before being applied to the rail;

Fig. 16 is a face view of the lower end of the muntin, likewise after being cut off and slotted and before being applied;

Fig. 17 is a horizontal section through the slotted portion of the muntin, taken on the line 17—17 of Fig. 16;

Fig. 18 is a fragmentary perspective view of a tubular muntin anchored in accordance with the invention to an open channelled bottom rail;

Fig. 19 is a face view of the anchorage shown in Fig. 18;

Fig. 20 is a vertical section through the rail, at one side of the muntin, taken on the line 20—20 of Fig. 19;

Fig. 21 is a face view of the lower end of the muntin, shown in Figs. 18 to 20 inclusive, after being cut off and slotted to fit with the rail and before being applied to the latter;

Fig. 22 is a side view of the lower end of the same muntin; and

Fig. 23 is a horizontal section through the slotted portion of the muntin, taken on the line 23—23 of Fig. 22.

In the embodiment of the invention shown in Figs. 1 to 6 inclusive a muntin 10 of generally T-shaped cross section is secured at its upper end to a top rail 11. The top rail is of course assembled with similar bottom and side rails (not shown) to complete the sash structure, and the muntin is secured at its lower end to the bottom rail.

The top rail 11—which in this particular embodiment happens to be of tubular form and of the so-called outside putty glazed type—has a shelf-like portion 12 for the reception of the glass and putty (not shown). This glazing portion 12 is provided with a backing flange 13 which terminates in a small inturned lip 14.

The muntin 10 has a center portion 15 and two oppositely extending side flanges 16 which terminate in small inturned lips 17. The opposite faces of the center portion 15 constitute back-to-back right angular continuations of the glazing portion 12 of the top rail, as is customary in ordinary muntin construction.

The muntin 10 is fitted to the rail 11 at any desired point longitudinally of the latter by cutting off the upper end 18 of the muntin to permit it to abut squarely with the glazing portion 12 of the rail, with the side flanges 16 of the muntin positioned flatly against the backing flange 13 of the rail, and with the lips 17 on the side flanges flush with the intersecting lip 14 on the backing flange. To allow for this, the muntin is provided closely adjacent its upper end with a narrow transverse slot 19, which slot is of the same width as the thickness of the lip 14 and cut into the muntin through the side flanges 16 and lip 17 at the location of the lip 14 and to a depth only sufficient to take the lip 14.

After the upper end of the muntin has been cut off, slotted and applied to the top rail, with the lip 14 disposed within the slot 19, the relatively short sections 20 of the lip 14 remaining exposed between the center portion 15 of the muntin and the lips 17 on the side flanges are flattened or beaded back securely against the side flanges 16 by a battering or riveting operation, thereby rigidly securing the upper end of the muntin to the top rail in a quick and inexpensive manner.

This novel form of anchorage permits the upper end of the muntin to be secured to the top rail at any desired point without cutting into or otherwise weakening the latter. The lower end of the muntin will of course be secured to the bottom rail in the same manner, and as many additional muntins as desired, either vertical or horizontal, or both, may be used in the same sash.

With this form of anchorage it is feasible to fabricate and stock sash and frames in standard sizes and later apply muntins to the same in any desired arrangement without disturbing the finished sash. The application of muntins in accordance with the present invention is such an exceedingly simple operation that it can be done on the job if desired without special tools or fixtures.

Fig. 7 shows the lower end of the muntin 10 secured in accordance with the invention to a bottom rail 21. It will of course be appreciated that the particular cross sectional configuration of the bottom rail, as well as the muntin and the other rails of the sash, is immaterial so far as the present invention is concerned, and that the invention is applicable to rails and muntins of practically any cross sectional configuration provided they include in some form the structural features essential to the new anchorage.

In the embodiment of the invention shown in Figs. 8 to 12 inclusive the muntin 22 and the rail 23 are of the so-called inside bead glazed type. The muntin is slotted at 24 for the reception of the lip 25 on the rail, and the portions 26 of the lip 25 exposed between the lips 27 of the muntin are battered down, exactly as in the previously described embodiment. The inside corner of the muntin is cut away at 28 for the reception of the glazed bead (not shown) used with this particular type of sash, but this last mentioned detail has nothing to do with the invention.

Figs. 13 to 17 inclusive illustrate a muntin of the same cross sectional configuration, applied to the bottom rail 29 of a sash. The particular bottom rail shown does not take a glazing bead, such as are used in the sash with the top and side rails and with the muntins, but is grooved instead for the reception of the lower edge of the glass. This grooving makes it necessary to provide two oppositely directed slots 30 and 31 in the muntin near the lower end of the same. The slot 30 is adapted to accommodate the lip 32 on the backing flange of the rail, while the slot 31 is adapted to accommodate the confronting lip 33. In order to position the squared off lower end of the muntin in the glazing groove against the surface 34, with the bottom rail 29 already assembled with the other rails, it is necessary to notch out the side corners of the lower end of the muntin at 35, whereby to permit the end of the muntin to be inserted sidewise in the groove and then turned back into its required position.

In the embodiment shown in Figs. 18 to 23 inclusive the same form of anchorage is again employed. In this case the muntin 36 happens to be of tubular construction and the rail 37 of open channel construction. In slotting the muntin at 38 to take the lip 39 on the rail, the slot is carried all the way through the tubular portion of the muntin, leaving a stepped up end 40 on the muntin, in addition to the squared off end 41, for abutment with the raised surface 42 on the rail.

I claim:

1. In sash construction, the combination with a substantially rigid sash rail having a glazing portion provided with a backing flange terminating in an inturned lip, which backing flange and inturned lip extend without interruption lengthwise of the rail at the location of the hereinafter mentioned muntin, of a muntin having a center portion provided with side flanges terminating in inturned lips; said muntin having one of its ends cut off to abut with the bottom of the glazing portion of the rail, and being provided adjacent said end with a narrow transverse slot in the side flanges and lips of sufficient depth to accommodate the lip on the backing flange; said muntin being assembled with the rail at any point longitudinally of the latter with said cut-off end abutting the bottom of the glazing portion and with said slot embracing the lip on the backing flange; and the sections of said lip exposed through the slot in the muntin being flattened back against the side flanges of the muntin between the center portion of the latter and the lips on the side flanges.

2. In sash construction, the combination with a substantially rigid sash rail having a glazing portion provided with a backing flange terminating in an inturned lip, which backing flange and inturned lip extend without interruption lengthwise of the rail at the location of the hereinafter mentioned muntin, of a muntin having a center portion provided with side flanges terminating in inturned lips; said muntin having one of its ends cut off to abut with the bottom of the glazing portion of the rail, and being provided adjacent said end with a narrow transverse slot in the side flanges and lips of sufficient depth to accommodate the lip on the backing flange; said muntin being assembled with the rail at any point longitudinally of the latter with said cut-off end abutting the bottom of the glazing portion and with said slot embracing the lip on the backing flange; and the sections of said lip exposed through the slot in the muntin being flattened back against the side flanges of the muntin between the center portion of the latter and the lips on the side flanges, said side flanges on the muntin being positioned flatly against the backing flange on the rail, with the lips on the side flanges flush with the intersecting lip on the backing flange.

3. In sash construction, the combination with a substantially rigid sash rail having a glazing portion provided with an inturned lip, which glazing portion and inturned lip extend without interruption lengthwise of the rail at the location of the hereinafter mentioned muntin, of a muntin having a web portion of less thickness than the height of said lip; said muntin having one of its ends positioned adjacent the rail in the glazing portion, and being provided adjacent said end with a narrow transverse slot in the web portion of sufficient depth to accommodate the lip; said muntin being assembled with the rail at any point longitudinally of the latter with the slot embracing the lip; and a portion of the lip exposed through the slot in the web portion of the muntin being clinched against the web portion.

WARD P. KESSLER.